United States Patent
Wilson et al.

(10) Patent No.: US 8,381,301 B1
(45) Date of Patent: Feb. 19, 2013

(54) SPLIT-FLOW ATTACK DETECTION

(75) Inventors: Clayton B. Wilson, Olathe, KS (US);
Frederick C. Rogers, Olathe, KS (US);
Reza Jafari, Olathe, KS (US); Hal S. Beech, Olathe, KS (US)

(73) Assignee: Sprint Communications Company L.P., Overland Park, KS (US)

(*) Notice: Subject to any disclaimer, the term of this patent is extended or adjusted under 35 U.S.C. 154(b) by 1043 days.

(21) Appl. No.: 12/369,327

(22) Filed: Feb. 11, 2009

(51) Int. Cl.
*H04L 29/06* (2006.01)
*G06F 17/00* (2006.01)
*G06F 11/00* (2006.01)
*G06F 12/14* (2006.01)
*G06F 12/16* (2006.01)
*G08B 23/00* (2006.01)

(52) U.S. Cl. .............. 726/24; 726/1; 709/231; 370/252; 370/312; 370/465

(58) Field of Classification Search ........................ None
See application file for complete search history.

(56) References Cited

U.S. PATENT DOCUMENTS

| | | | |
|---|---|---|---|
| 5,570,366 A * | 10/1996 | Baker et al. | 370/312 |
| 8,102,783 B1 * | 1/2012 | Narayanaswamy et al. | 370/252 |
| 8,195,864 B2 * | 6/2012 | Whitby-Strevens et al. | 710/315 |
| 2007/0058668 A1 * | 3/2007 | Culbreth et al. | 370/465 |
| 2009/0199268 A1 * | 8/2009 | Ahmavaara et al. | 726/1 |
| 2010/0217886 A1 * | 8/2010 | Seren et al. | 709/231 |

* cited by examiner

*Primary Examiner* — Shin-Hon Chen

(57) ABSTRACT

A system, method, and computer-readable media are described for identifying a split-flow communications session occurring over two or more incompatible communications protocols. A data stream governed by a first communications protocol is associated with a device or end device by comparing information in the data packet headers with information in a device database that matches devices with the header characteristics such as an IP address. A second data stream governed by a second incompatible communications protocol is similarly associated with the same target endpoint or device. The two incompatible data streams may then be evaluated as a single split-flow communications session for malicious content, or for other purposes. If malicious content is detected, corrective policies may be implemented on the split-flow communications session to protect the device from the malicious content.

20 Claims, 7 Drawing Sheets

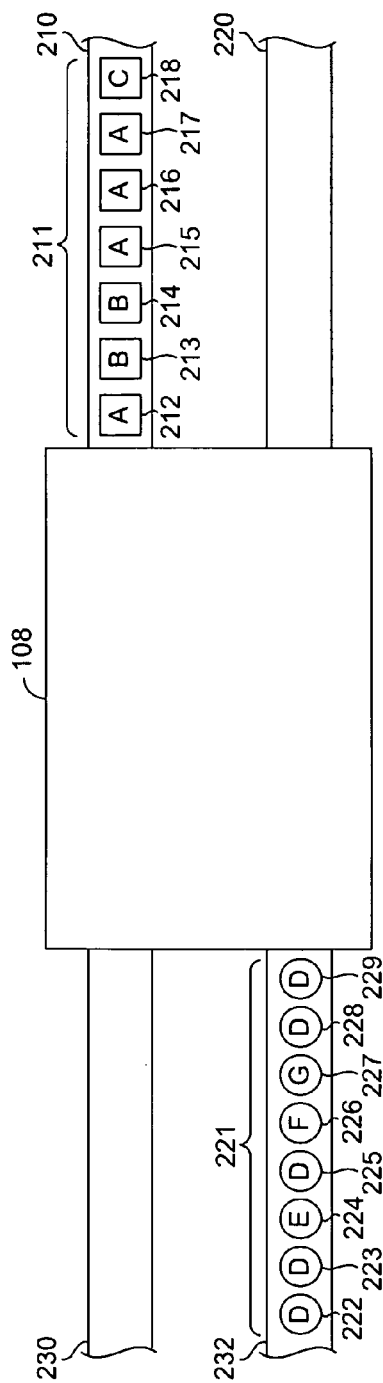
FIG. 2.
FIG. 3.
FIG. 4.

SPLIT-FLOW ATTACK DETECTION

SUMMARY

Embodiments of the invention are defined by the claims below, not this summary. A high-level overview of various aspects of the invention are provided here for that reason, to provide an overview of the disclosure and to introduce a selection of concepts that are further described below in the Detailed-Description section. This Summary is not intended to identify key features or essential features of the claimed subject matter, nor is it intended to be used as an aid in isolation to determine the scope of the claimed subject matter.

In a first illustrative embodiment, one or more computer-readable media having computer-executable instructions embodied thereon for performing a method of determining that a first data stream using a first communications protocol and a second data stream using a second communications protocol are terminal at a single communications device are provided. The method includes monitoring a first communication of data including the first data stream including a first data packet formatted according to the first communications protocol. The method also includes monitoring a second communication of data including the second data stream including a second data packet formatted according to the second communications protocol. The method further includes determining that the first data stream is bound for the single communications device. The method also includes determining that the second data stream is also bound for the single communications device. The method also includes, based on said second data stream and said first data stream being bound for the single communications device, storing in a first data structure that is embodied on a storage component an indication that the first data stream and the second data stream are both terminal at the single communications device. The first data stream and said second data stream are two portions of the collective network traffic terminal at the single communications device.

In another illustrative embodiment, a computerized system for detecting a split-flow communications session occurring in two or more communications of data utilizing at least two incompatible communication protocols is provided. The system includes a first monitoring component that monitors a first communication of data comprising first data packets formatted according to a first protocol. The system also includes a second monitoring component that monitors a second communication of data comprising second data packets formatted according to a second protocol. The system further includes a correlation component that determines a first data stream in the first communication of data and a second data stream in the second communication of data are part of a single split-flow communications session by determining the first data stream and the second data stream have a target endpoint in common. The target endpoint is a single communications device.

In yet another illustrative embodiment, one or more computer-readable media having computer-executable instructions embodied thereon for performing a method of detecting malicious activity in split-flow communications terminating at a single communications device. The method includes receiving a first data packet from a first communication of data formatted according to a first communications protocol. The method also includes determining that characteristics of the first data packet do not match characteristics of data packets associated with presently identified data streams. The method further includes determining that the first data packet is associated with a target endpoint by associating the first data packet with a device by comparing at least one characteristic from a first header on the first data packet with information in a device profile database. The method also includes storing in a data structure that is embodied on a storage component a first indication that data packets in the first communication of data having the at least one characteristic from the first header are part of a first data stream. The method further includes receiving a second data packet from a second communication of data formatted according to a second communications protocol. The method also includes determining that characteristics of the second data packet do not match characteristics of data packets associated with the presently identified data streams. The method also includes determining that the second data packet is associated with the target endpoint by associating the second data packet with the device by comparing at least one characteristic from a second header on the second data packet with the information in the device profile database. The method further includes storing in the data structure a second indication that data packets in the second communication of data having the at least one characteristic from the second header are part of a second data stream. The method also includes determining that the first data stream and the second data stream are two parts of split-flow communications session because the first data stream and the second data stream have the target endpoint in common. The method further includes storing in the data structure an indication that the first data stream and the second data stream are part of the split-flow communications terminated at the single communications device.

BRIEF DESCRIPTION OF THE SEVERAL VIEWS OF THE DRAWINGS

Illustrative embodiments of the present invention are described in detail below with reference to the included drawing figures, wherein:

FIG. 2 is a drawing illustrating the communication of data through an inspection component in two separate physical pathways according to an embodiment of the present invention;

FIG. 3 illustrates a first data stream formatted according to a first communication protocol within a communication of data according to an embodiment of the present invention;

FIG. 4 illustrates a second data stream formatted according to a second communications protocol within a communication of data according to an embodiment of the present invention;

DETAILED DESCRIPTION

Figure 1:
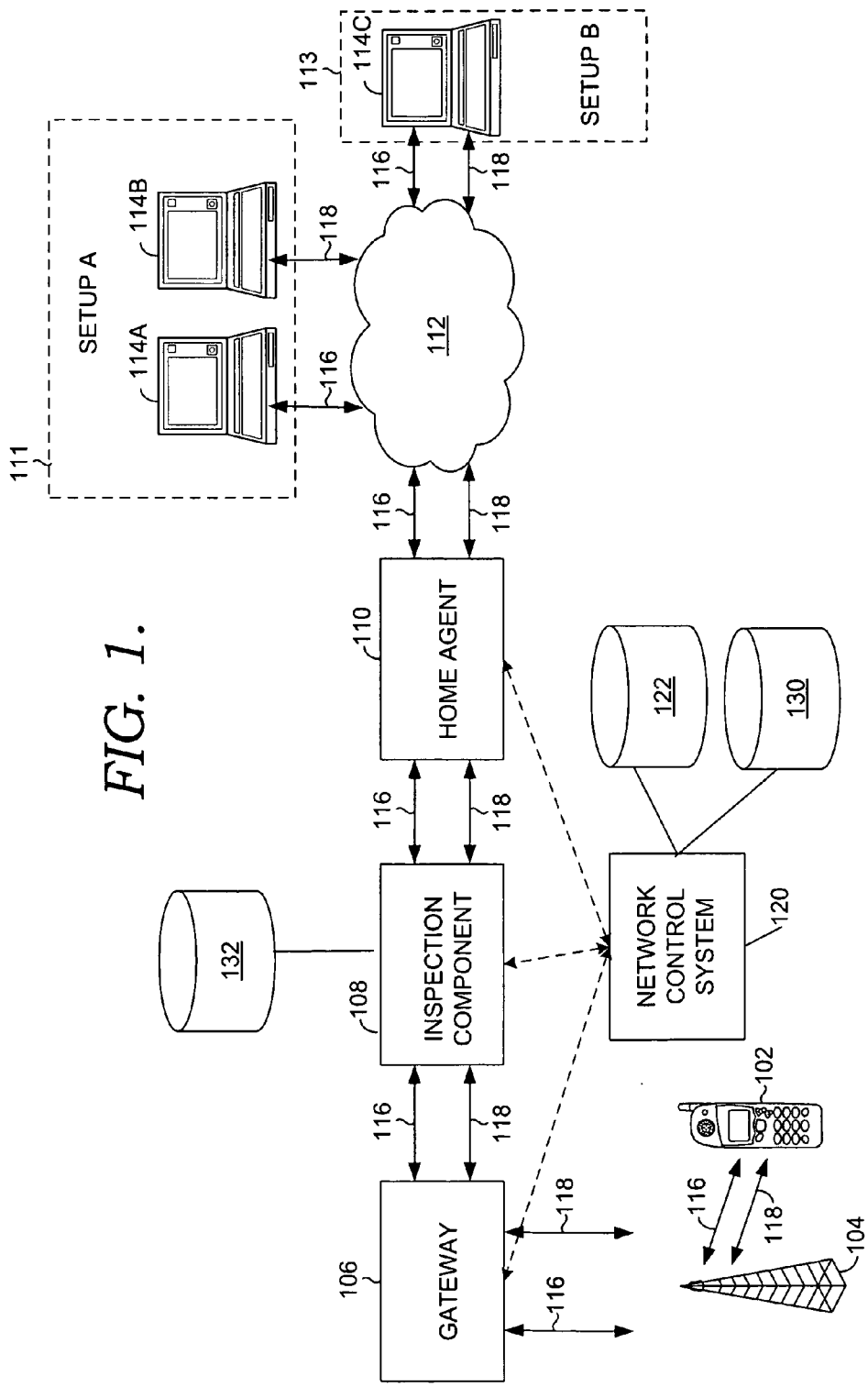
FIG. 1 is a drawing of an illustrative environment in which an embodiment of the present invention may operate.

Embodiments of the present invention provide systems and methods for identifying two data streams utilizing different communication protocols that are part of a single split-flow communications session. A split-flow communications session splits data having a unified communicative content between two data streams formatted using two or more communications protocols. On one end of the slit-flow communications session, the two data streams terminate at a single device. The other end may terminate at one or more devices. In one embodiment, the communications protocols or address domains of the two or more communications protocols are incompatible so that it is not apparent from the characteristics of the data streams that they have an endpoint in common. It may be determined that the two incompatible data streams have an endpoint in common by using data stream characteristics and using network operational data sources to obtain the identity of the device (or devices) that is (are) terminal for each data stream, and then comparing the device identities.

Throughout the description of the present invention, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present invention. The following is a list of these acronyms:

| | |
|---|---|
| AS | Application Server |
| CDMA | Code Division Multiple Access |
| GSM | Global System for Mobile Communications |
| LAN | Local Area Network |
| MSC | Mobile Switching Center |
| PDA | Personal Digital Assistant |
| PDSN | Data packet Data Serving Node |
| RAM | Random Access Memory |
| ROM | Read Only Memory |
| SMSC | Short Messaging Service Center |
| SIP | Session Initiation Protocol |
| TDMA | Time Division Multiple Access |

Embodiments of the present invention may be embodied as, among other things: a method, system, or computer-program product. Computer-readable media include both volatile and nonvolatile media, removable and nonremovable media, and contemplates media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

An Illustrative Operating Environment

Embodiments of the present invention may be practiced in a communications network providing service to devices communicatively coupled to the communications network. An illustrative operating environment 100 that contains a few of the components within such a communications network is shown in FIG. 1. The components shown in FIG. 1 are the primary components that embodiments of the invention may interact with during operation. The components shown in FIG. 1 are described in brief and with an emphasis on function for the sake of simplicity. The components within FIG. 1 are communicatively coupled to each other in a manner appropriate for carrying out their respective function within the illustrative operating environment 100. Embodiments of the present invention are not limited by the communication protocols or formats used to facilitate communications between components; those mentioned are for the sake of enablement and not meant to be limiting.

Illustrative operating environment 100 includes communications device 102, base station 104, gateway 106, inspection component 108, home agent 110, network 112, public-endpoint scenario A 111, which includes communications device 114A and communications device 114B, public-endpoint scenario B, which includes communications device 114C, a first data stream 116, a second data stream 118, a network control system 120, a device identity and network-state data store 122, a device-address-bindings data store 130, and a session-state-data store 132. The present invention is not limited to embodiments that include a wireless device or a wireless network. However, the present invention may operate in a wireless network and with wireless devices. The present invention is not limited to embodiments that include connectionless-packet-network architectures with end-to-end (network-layer) addressing carried within each packet. However, the present invention may operate in a connectionless-packet network. The present invention is not limited to embodiments that include use of the Internet Protocol, either IPv4 or IPv6. However, the present invention may operate in an IP network, including an IP network that concurrently provides IPv4 and IPv6 services to a device. The present invention is not limited to embodiments that include use of Mobile IP. However, the present invention may operate in a network that provides Mobile IP services to a device. Accordingly, illustrative operating environment 100 includes a wireless network that can provide to a device, concurrently, IPv4 and IPv6 Mobile IP network services. Any IP access network that contains the operational ability to distinguish between and uniquely identify serviced devices or the operational ability to identify each device's unique point of attachment to the access network provides a suitable operating environment.

Illustrative operating environment 100 may use a device characteristic that reliably identifies each device to the network and distinguishes each device from any other to identify each device. For example, a cellular device ESN (presumed unique, unalterable, and unduplicable) presented to the access network during network entry, especially if validated by an authentication process, could identify a unique device. An NAI, especially if authenticated or with network controls that prevent duplicate simultaneous uses of the same NAI may also be a suitable device characteristic. Similarly, a "unique" MAC (MAC-48, EUI-48, EUI-64) installed in a device during manufacturing can be a unique device identifier and also identify the layer-2 point of attachment to some networks. A private asymmetrical cryptographic key installed in a device during manufacturing, and the corresponding X.509 public certificate is another example of a suitable device characteristic. These examples are meant to be illustrative rather than exhaustive. Other device characteristics may be used to uniquely identify a device.

Mobile device 102 is depicted as a wireless communications device communicating over an air interface with base station 104. Mobile device 102 is a wireless terminal that is adapted to receive communications and media over the wireless networks included in illustrative operating environment 100. Some lower-level details of mobile device 102 are not shown so as to not obscure embodiments of the present invention. For example, mobile device 102 may include a bus that directly or indirectly couples the following devices: memory: one or more processors, one or more presentation components such as a display or speaker, input/output (I/O) ports, I/O components, and a power supply such as a battery. Mobile device 102 may communicate via wireless protocols, such as code division multiple access ("CDMA"), global system for mobile communications ("GSM"), or time division multiple access ("TDMA"), as well as others, to communicate with base station 104.

Mobile device 102 may take on any of a variety of forms. By way of example, mobile device 102 may be a mobile telephone, smart phone, laptop computing device, desktop computing device, server, personal digital assistant ("PDA") or any combination of these or other devices. Mobile device 102 has the ability to present one or more forms of media content. Examples of media content that could be displayed include, TV shows, movies, videos, MP3 files, and radio programs. This list is not exhaustive. The media may be presented as it is received from the wireless network or from memory within mobile device 102. Mobile device 102 may also be capable of receiving one or more forms of communication. Examples of communications that may be received include phone calls, video calls, text messages, multimedia messages, emails, calendar updates, and task reminders.

Within illustrative operating environment 100, the physical medium used to communicate network data between mobile device 102 and base station 104 is provided by the radio capabilities of mobile device 102 and base station 104. In an embodiment of the present invention, inspection component 108 is allowed to identify all traffic exchanged with mobile device 102. To facilitate this process, inspection component 108 may be located in a traffic aggregation region of the access network. Inspection component 108 does not require direct inspection of the network point of attachment of mobile device 102 to base station 104 and inspection component 108 does not require placement near the network edge, as represented in this example by base station 104, to identify traffic that is terminal at mobile device 102.

The mobile device 102 has an operational association with the access network represented in part by base station 104, gateway 106, inspection component 108, home agent 110, network control system 120, and device identity and network state data store 122. When mobile device 102 is communicatively coupled with the access network, device identity and network state data store 122 contains information that identifies mobile device 102, differentiates it from any other mobile device communicatively coupled with the access network, and provides distinguishing operational characteristics such as the network addresses employed by the device at a current point in time.

In one embodiment, this operational association is formed between mobile device 102 and the access network, in part, by a device authentication process. During the device authentication process mobile device 102 may present a network access identifier (NAI) to the network. Next, in response to a challenge originating from network control system 120 and device identity and network state data store 122, mobile device 102 returns a response to network control system 120 that demonstrates its possession of a secret data value associated with the presented NAI.

During this period of communicative coupling, device identity and network state data store 122 provides an operational capability to associate with mobile device 102 a unique communication protocol state. In one embodiment, mobile device 102 and the access network are communicatively coupled to support IPv4 communications capabilities. In this case the unique communication protocol state may consist of an IPv4 address assigned by some element of the access network to mobile device 102 for its operation as an IPv4 endpoint. In this embodiment, device identity and network state data store 122 will contain an association between mobile device 102's NAI and the assigned IPv4 address for the duration of the communicative coupling.

Continuing with FIG. 1, the mobile device 102 is a dual stack device. A dual stack device is capable of receiving and transmitting data packets formatted according to at least two different communications protocols. In one embodiment, the first communications protocol is IPv4 and the second communications protocol is IPv6. In one embodiment, mobile device 102 is admitted into a communicative coupling with the access network through an NAI-based authentication process. As a result of this process, device identity and network state data store 122 will associate both the IPv4 address and the IPv6 address employed by dual stack mobile device 102 with mobile device 102's NAI.

Base station 104 is a fixed station used for communicating with mobile device 102. Standard air interface protocols, such as code division multiple access ("CDMA"), global system for mobile communications ("GSM"), or time division multiple access ("TDMA"), as well as others, may be used by base station 104 to communicate with mobile device 102. Other network communications interface arrangements are also possible. A base station controller (not shown) is responsible for handling traffic and signaling with mobile device 102. Only one base station 104 is shown, and without its many components, for the sake of clarity. Mobile device 102 could be in simultaneous communication with multiple base stations.

Access gateway 106 provides a boundary between radio communication functions embodied in one or more radio access systems that form the access-facing portion of illustrative operating environment 100 and the standard internet protocol (IP) communication functions (including Mobile IP) embodied in the public-network facing portion (e.g., network 112) of illustrative operating environment 100. Access gateway 106 might be, for example, an ASN-GW, a PDSN, a SGSN/GGSN, and the like. In embodiments, access gateway 106 can be coupled with a foreign agent (FA). In one embodiment, access gateway 106 provides home agent (HA) 110 header data to packets such that packets received by access gateway 106 may be communicated to an HA. Packets might be tunneled to and from a HA over unencrypted IP-in-IP tunneling.

Inspection component 108 monitors data packets having two or more incompatible communication protocols or utilizing disparate addressing domains such as those in first data stream 116 and second data stream 118. Inspection component 108 is communicatively coupled with device identity and device-state data store 122 and data-stream data store 132. Device identity and device state data store 122 includes device information such as IP addresses associated with the device. Inspection component 108 uses device identity and network-state data store 122 to associate individual data packets with mobile devices that are communicatively coupled with the access network. Inspection component 108 identifies communication sessions consisting of one or more packets and stores communication-session-state records in data-stream data store 132. Data packets or communication sessions associated with the same endpoint but employing two incompatible communication protocols or disparate addressing domains are subject to further analysis by inspection component 108 for the identification of split-flow communications sessions or aggregate network capacity demand expressed by said endpoint. The data-stream data store 132 stores an indication that two data streams form a single split-flow communications session.

Home agent 110 helps route data packets to a mobile device 102. Other components within illustrative operating environment 100 communicate with home agent 110 to determine the location of mobile device 102.

Network 112, is a network designed to carry data in the form of data packets. Network 112, is a wide area network (WAN) and may include the Internet.

Identifying a split-flow communications session occurring over two incompatible communication protocols allows the split-flow communication session to be analyzed for a variety of purposes, including detecting malicious content that would otherwise go undetected if the split-flow data streams were analyzed separately. Inspection component 108 will be explained in more detail in association with subsequent figures. A split-flow communications session occurs between endpoints. Communications device 102 is one of the end points. Two-different end-point scenarios 111 and 113 are shown. However, embodiments of the present invention are not limited to these two end-point scenarios.

End-point scenario A 111 includes communications device 114A and communications device 114B. Communications device 114A is communicating using the first data stream 116, which has a first addressing domain. Communications device 114B is communicating using the second data stream 118, which has a second addressing domain that is incompatible with the first addressing domain. Both communications terminate at the communications device 102. In this case, communications devices 114A and 114B may coordinate their communications to form a split-flow communications session. The first data stream 116 and the second data stream 118 may have disparate addressing domains because they each utilize different communications protocols (e.g., IPv4, IPv6).

End-point scenario B 111 includes communications device 114C. Communications device 114C is communicating using the first data stream 116, which has a first addressing domain, and the second data stream 118, which has a second addressing domain. As explained in more detail previously, the first and second addressing domains are incompatible. Both communications terminate at the communications device 102. The first data stream 116 and the second data stream 118 may have disparate addressing domains because they each utilize different communications protocols (e.g., IPv4, IPv6).

Communications devices 114A, 114B, and 114C (hereinafter collectively referred to as communication device 114) are depicted as laptop computers, but embodiments are not limited to communication sessions utilizing laptop computers as an end point. Some lower-level details of communications device 114 are not shown so as to not obscure embodiments of the present invention. For example, communications device 114 may include a bus that directly or indirectly couples the following devices: memory: one or more processors; one or more presentation components such as a display or speaker; input/output (I/O) ports; I/O components; and a power supply such as a battery. Communications device 114 may take on any of a variety of forms. By way of example, communications device 114 may be a mobile telephone, smart phone, laptop computing device, desktop computing device, server, personal digital assistant ("PDA") or any combination of these or other devices. Like the mobile device 102, the communications device 114 may be a dual stack device. A dual stack device is capable of receiving and transmitting IP data packets formatted according to at least two different communications protocols. In one embodiment, the first communications protocol is IPv4 and the second communications protocol is IPv6.

The first data stream 116 contains data packets addressed according to a first addressing domain. The data packets may also be formatted according to a first communications protocol. For example, the data packets in the first data stream 116 could be formatted according to IPv4. The first data stream 116 communicates information between mobile device 102 and communications device 114. The first data stream 116 may be bi-directional.

A data stream consists of multiple packets of data that are part of a single communication session. A communication session can take many forms but is generally bounded by a period of time and a communicative purpose. For example, a communication session could be a single email from one communication device to another. In some embodiments, the email may be broken into multiple data packets and transmitted as part of a data stream through a data pathway. A data pathway may contain multiple data streams between multiple parties. In another embodiment, a data stream may include bi-directional communications such as during an online chat session between two communication devices. During an online chat the data stream would consist of data packets going back and forth between the two participating communication devices. This communication session and associated data streams terminate from the perspective of the users of the respective communication devices when the online chat ends. While this is easy to define in terms of the user's intent, in most cases, programs analyzing these communications are not aware of the user's intent and instead make assumptions by applying a threshold time period to determine when a communications session has terminated. For example, it may be assumed that the data stream between two endpoints conveying instant messaging-type data is terminated after inactivity of greater than five minutes or some other designated period of time. Similarly, an instant messaging communication session may be deemed terminated after a total elapsed time, such as an hour. Communication sessions involving web browsing may be defined using a threshold period of time.

The second data stream 118 carries data packets having a second addressing domain. The addressing domain used in the second data stream 118 may be different than, and incompatible with, the communications protocol used in the first data stream 116. The data packets may also use a separate communications protocol. The communications protocol used in the second data stream 118 may be different than, and incompatible with, the communications protocol used in the first data stream 116. For example, the data packets in the second data stream 118 may be formatted according to IPv6. IPv4 and IPv6 are incompatible communication protocols. IPv4 and IPv6 also use disparate addressing domains. Like the first data stream 116, the second data stream 118 may be bi-directional and carries information between mobile device 102 and communications device 114.

First data stream 116 and second data stream 118 may be conveyed in a single physical pathway or two separate physical pathways. A physical pathway may be a wire, fiber, radio wave or other such medium suitable for transmitting data. Similarly, first data stream 116 and second data stream 118 may be conveyed over one or more air interfaces between base station 104 and mobile device 102.

Further Explanation of Data Flows

Turning now to FIG. 2, the communication of data through inspection component 108 is shown in accordance with an embodiment of the present invention. FIG. 2 includes two separate communications of data. The first communication of data 211 includes data packet 212, 213, 214, 215, 216, 217, and 218. Communication of data 211 occurs through data pathways 210 and 230. A data pathway is a physical medium, such as a wire or a fiber, through which data packets are transferred. FIG. 2 shows data pathway 210 coupled to inspection component 108 and data pathway 230 coupled to the other side of inspection component 108. Thus, the first communication of data passes from pathway 210 through inspection component 108 to pathway 230. While the data flow in FIG. 2 is illustrated as going from right to left, in reality, the communication of data could be in both directions or in either direction. The data packets 212, 213, 214, 215, 216, 217, and 218, in communication of data 211 are all squares. The squares indicate that the data packets all conform to the same communications protocol and/or addressing domain.

A second communication of data 221 is shown through data pathway 220 and data pathway 232. Communication of data 221 includes data packets 222, 223, 224, 225, 226, 227, 228, and 229. The data packets in communication of data 221 are presented as circles. The circles represent data packets that all conform to the same communications protocol or addressing domain. The communications protocol and/or addressing domain used for the communication of data 221 is different than, and incompatible with, the communications protocol and/or addressing domain used for the communication of data 211. For example, communication of data 211 could use a communications protocol such as IPv4 and the communication of data 221 could use IPv6. As is known in the art, IPv4 and IPv6 are incompatible. Thus, FIG. 2 shows two communications of data each having its own communications protocol and/or addressing domain.

Both communications of data contain data streams. Data streams are indicated by the letter associated with each data packet. For example, data packet 212, 215, 216, and 217 are all part of data stream 300, all of which are associated with identification information "A." Data stream 300 is shown in FIG. 3 apart from the other data packets in communication of data 211. The "A" on data packets within data stream 300 indicates the packets contain similar identification information in the packet headers. For example, all of the packets that are part of data stream 300 may have the same source and destination IP address, as well as other information like the same port information. The payloads associated with each data packet will typically be different. Returning to FIG. 2, data packets 213, 214, and 218 are associated with different identification information (i.e., "B" and "C") and, therefore, different data streams. The letters B, C, D, E, F, and G on the other data packets illustrate that those packets contain different identification information in the packet headers.

Several data streams are also shown in communication of data 221. For example, data streams associated with identification information "D," "E," "F," and "G" are illustrated. FIG. 4 shows data packets 222, 223, 225, 228, and 229 which form data stream 400 all of which are associated with identification information "D." A limited number of data streams are illustrated for the sake of simplicity, but in reality thousands of data streams could be passing through inspection component 108 in a short period of time.

Figure 5:
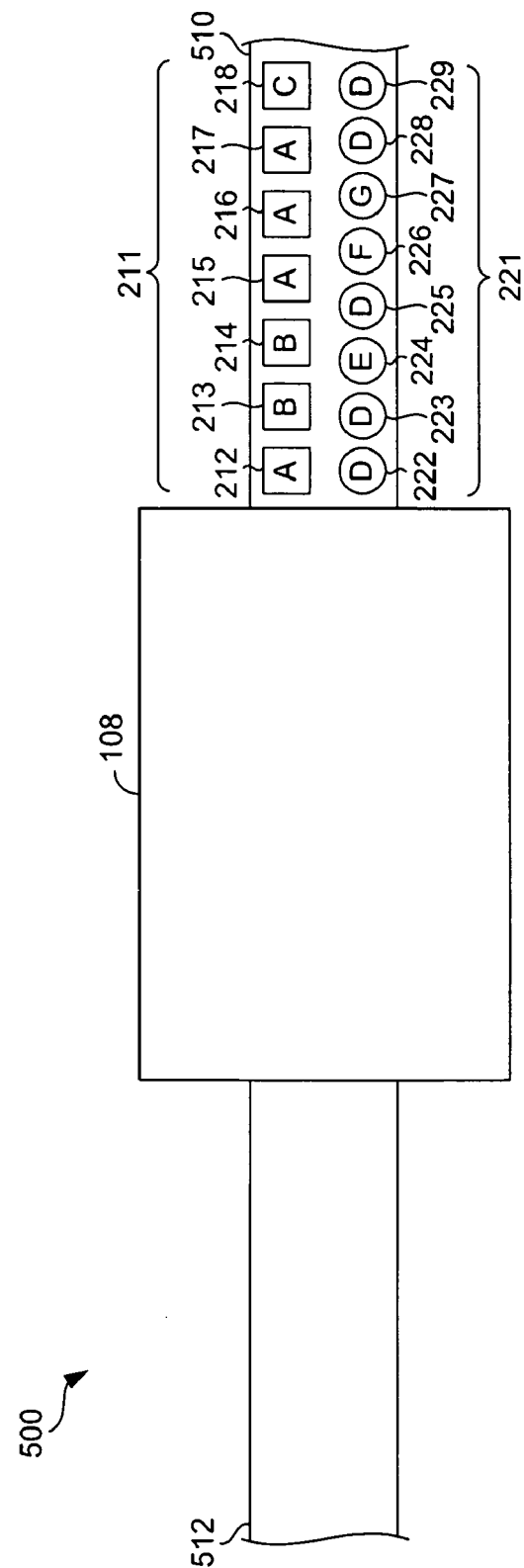
FIG. 5 is a drawing illustrating the communication of data through an inspection component in a single physical pathway according to an embodiment of the present invention.

Turning now to FIG. 5, communications of data 211 and 221 are shown in a single data pathway. Communications of data 211 and 221 are communicated through data pathway 510 and 512. The other components of FIG. 5 have been described previously with reference to FIG. 2. Embodiments of the present invention are not intended to be limited by the number of physical data pathways monitored by an inspection component or series of inspection components. In embodiments of the present invention, the data streams may be in one or more physical pathways monitored by one or more inspection components.

Identifying a Split-Flow Communications Session

Figure 6:
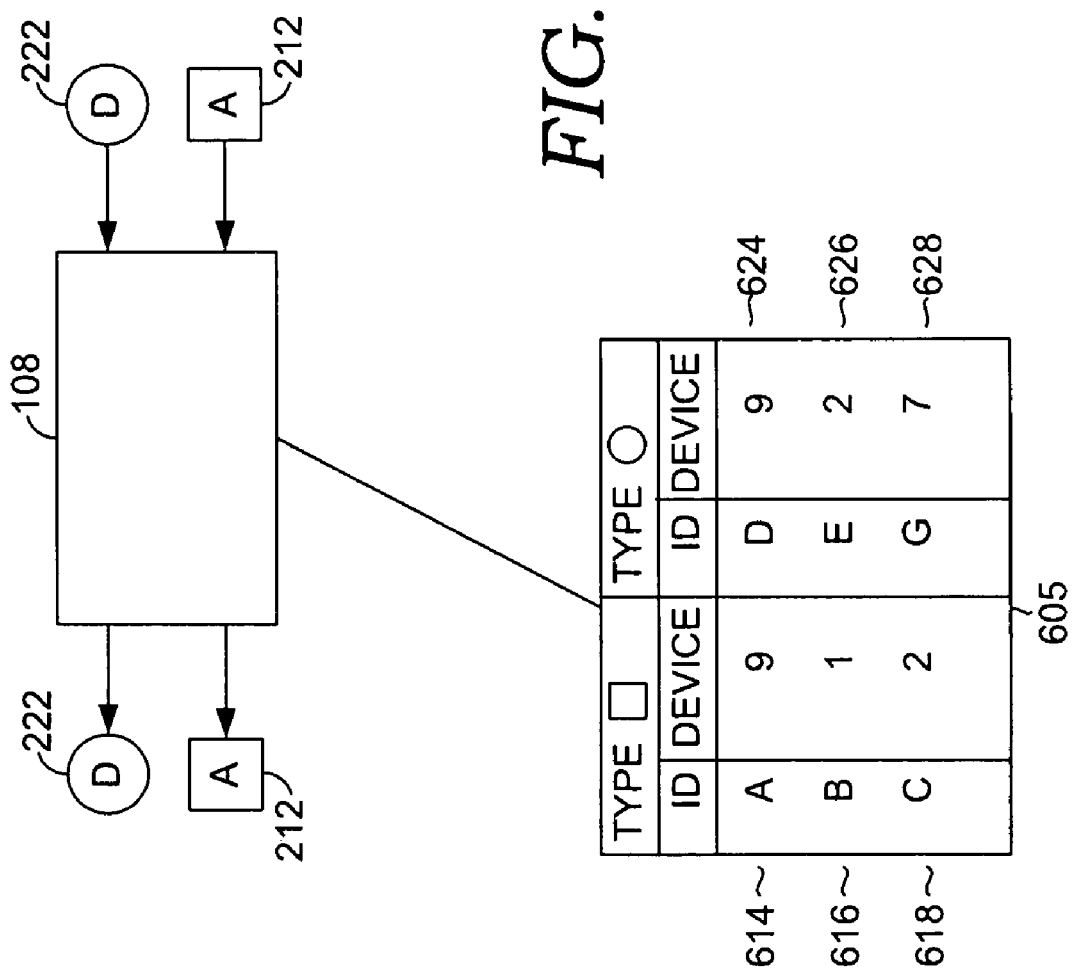
FIG. 6 shows the examination, by an inspection component, of two data packets that are part of already identified data streams and have incompatible communications protocols in accordance with embodiments of the present invention.

Turning now to FIG. 6, the examination, by an inspection component 108, of two data packets that are part of already identified data streams and have incompatible communications protocols is shown in accordance with embodiments of the present invention. The embodiment illustrated in FIG. 6 describes the data streams as having incompatible communications protocols. In another embodiment, the data streams could have compatible communications protocols, but disparate addressing domains. Disparate addressing domains use incompatible address descriptions.

Inspection component 108 receives data packet 212 and data packet 222. As described previously, data packet 212 conforms to a first communication protocol represented by the square shape of data packet 212 and has a set of identification information represented by the "A." Data packet 222 conforms to a second communication protocol represented by the circle shape. Data packet 222 has a set of identification information represented by the "D." Upon receiving data packet 212, the inspection component 108 examines the identification information contained in the header of data packet 212. The identification information in data packet 212 is compared against the identification information associated with known data streams in a data-stream data store 605.

The data stream data store 605 contains a list of presently identified data streams. Data stream 614 conforms to a first communication protocol indicated by a square. The identification information is represented as "A" and has previously been associated with device 9. Data stream 616 is also associated with the first communication protocol. The identification information of data stream 616 is represented by the letter "B" and is associated with device number 1. Data stream 618 is also associated with the first communication protocol. Data stream 618 has identification information represented by the letter "C" and is associated with device number 2. Data stream 624 is associated with a second communication protocol and is associated with device 9. The identification information for data stream 624 is indicated by the letter "D." Data stream 626 is associated with the second communication protocol and is associated with device 2. The identification information for data stream 626 is indicated by the letter "E." Data stream 628 is also associated with the second communication protocol and is associated with device 7. The identification information associated with data stream 628 is indicated by the letter "G." Thus, six different data streams are identified in data stream data store 605.

Returning to the examination of data packet 212 by inspection component 108, the inspection component 108 determines that data packet 212 is already associated with an existing data stream 614 because the identification information "A" in data packet 212 is the same as the identification information associated with data packets in data stream 614.

Similarly, data packet 222 would also be determined to be associated with an existing data stream 624. Since both of the data packets 212, 222 are associated with existing data streams, the data stream data store 605 does not need to be updated. Data packet 212 and data packet 222 could be evaluated as part of the data streams with which they are associated by methods described subsequently.

Figure 7:
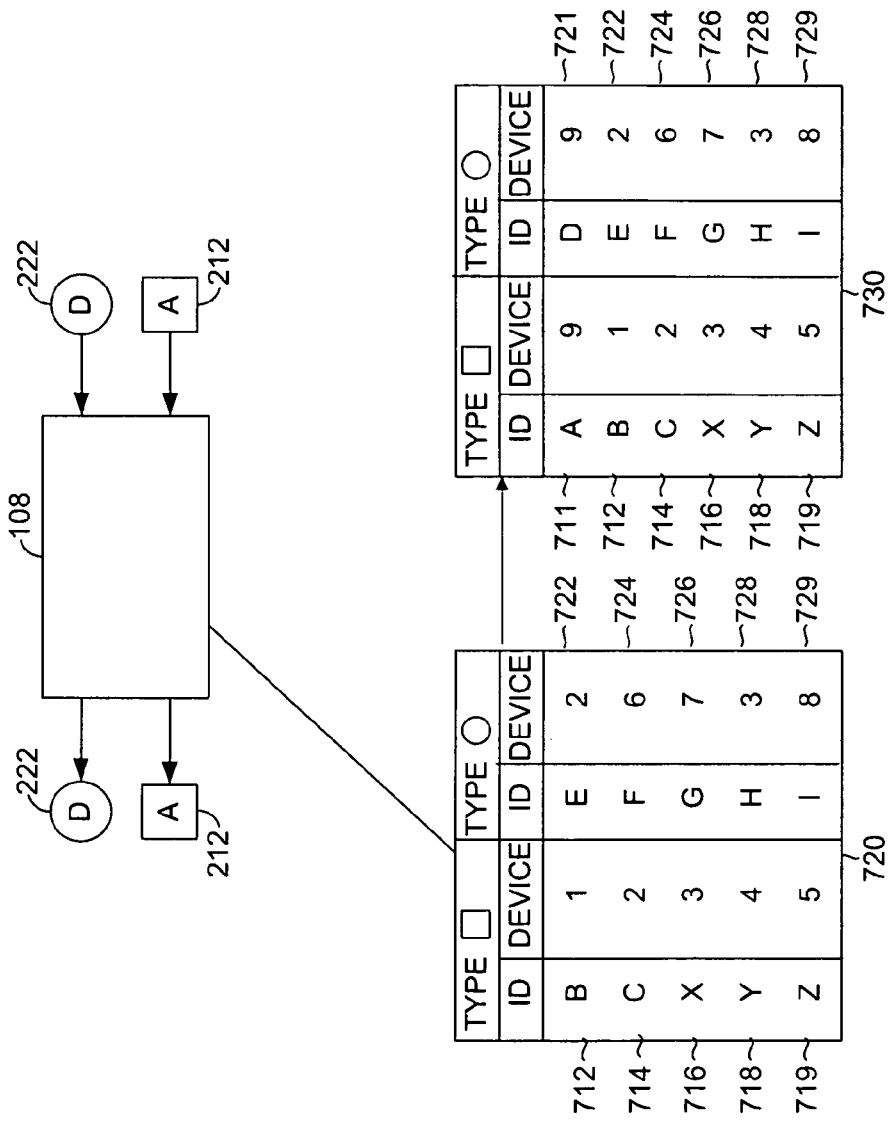
FIG. 7 shows the examination, by an inspection component, of two data packets that are not part of already identified data streams and have incompatible communications protocols in accordance with embodiments of the present invention.

Turning now to FIG. 7, the examination, by an inspection component 108, of two data packets that are not part of already identified data streams and have incompatible communications protocols is shown in accordance with embodiments of the present invention. As with FIG. 6, the data streams could simply have disparate addressing domains rather than different communications protocols. Inspection component 108 receives data packet 212 and data packet 222. Data packets 212 and 222 are compared against existing data streams in data stream data store 720. Data stream data store 720 includes data stream 712 identified by identification information "B" and associated with device 1. Data stream 714 contains identification information represented as "C" and is associated with device 2. Identification data stream 716 is associated with identification information "X" and associated with device 3. Data stream 718 is associated with identification information "Y" and device 4. Data stream 719 is associated with identification information "Z" and device 6. Data streams 712, 714, 716, 718 and 719 all conform to a first communications protocol. Data stream 722 is associated with identification information "E" and device 2. Data stream 724 is associated with identification information "F" and device 6. Data stream 726 is associated with identification information "G" and device 7. Data stream 728 is associated with identification information "H" and device 3. Data stream 729 is associated with identification information "I" and device 8. Data streams 722, 724, 726, 728, and 729 conform to a second communications protocol.

Upon comparing identification information in data packet 212 with data stream data store 720, the inspection component 108 determines that data packet 212 is not part of an existing data stream. Accordingly, the data stream data store 720 is updated to include a new data stream 711. Data stream 711 is shown in updated data stream data store 730. Data stream 711 is associated with identification information "A" and device 9. Similarly, upon comparing identification information in data packet 222 with data stream data store 720, the inspection component 108 determines that data packet 222 is not part of an existing data stream. Accordingly, data stream data store 720 is updated to include a new data stream 721. Data stream 721 is shown in updated data stream data store 730. Data stream 721 is associated with identification information "D" and device 9.

In this case, data packet 212 and data packet 222 are both associated with device 9. Upon making this determination, the inspection component 108 determines that data stream 711 and data stream 721 are two parts of a single split-flow communications session. Similarly, data stream 712 and data stream 722 are both associated with the same device and are determined to be two parts of a single split-flow communications session. Data stream data store 720 and updated data stream data store 730 associate each data stream with at least one device. In this case, the device represents one endpoint of the communication session. The other endpoint of the communication session may be known or unknown. In the event the other end of the data stream communication session is known, it may be added as an additional device field in the data stream data stores 720 and 730. Determining both endpoints increases the accuracy of the determination that the two data streams are part of a single split-flow communications session. However, knowing both endpoints is not necessary to make the determination in accordance with embodiments of the present invention.

Figure 8:
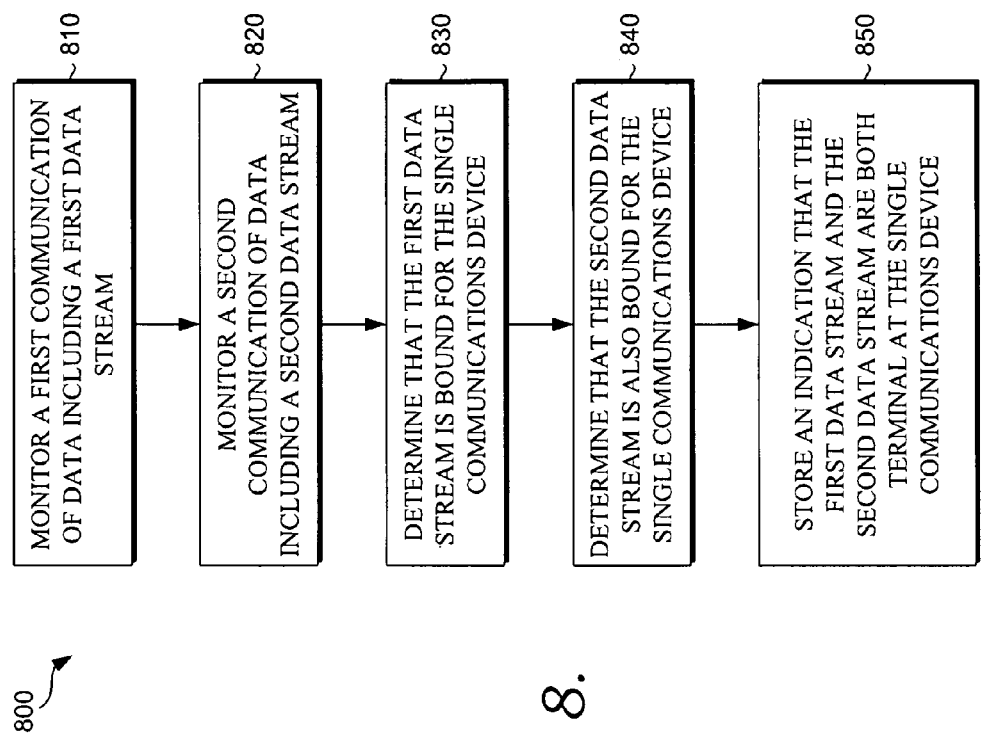
FIG. 8 is a flow diagram in which a method of determining that a first data stream using a first communications protocol and a second data stream using a second communications protocol are terminal at a single communications device is described according to an embodiment of the present invention.

Turning now to FIG. 8, a method of determining that a first data stream using a first communications protocol and a second data stream using a second communications protocol are terminal at a single communications device is shown in accordance with an embodiment of the present invention. At step 810, a first communication of data, including a first data stream, is monitored. The data packets in the first communication of data, including those in the first data stream, are formatted according to a first communications protocol.

At step 820, a second communication of data, including a second data stream, is monitored. The data packets in the second communication of data, including those in the second data stream, are formatted according to a second communications protocol. The first communications protocol and the second communications protocols are incompatible. For example, the first communications protocol may be IPv4 and the second communications protocol could be IPv6. The two communication protocols are incompatible in part because the header identification information including the source and destination IP addresses are different. For example, even if a first device was sending a data stream to a second device in both the first communication and the second communication of data, the header information for data packets in the first and second data stream would be different.

The first and second communication of data may occur in a single physical data pathway. That is to say, the first and second communication of data may be within a single wire, a single fiber, a bundle of wires, or a bundle of fibers. In another embodiment, the first communication and the second communication are each in individual physical data pathways. The first and second communication of data may be monitored by a device such as inspection component 108 described previously. In one embodiment, multiple inspection components may be used in conjunction with one another to monitor communications of data in one or more physical data paths. Monitoring data may include copying the data. In one embodiment, each data packet within the first and second communication of data is examined.

At step 830, it is determined that the first data stream is bound for a target endpoint. A target endpoint is the single communications device. In one embodiment, the target endpoint is determined by comparing an IP address associated with the first data stream to a device identification table containing IP addresses assigned to the various devices. Other identification information associated with the first data stream may also be compared with information in a device database to confirm the data stream is bound for the target endpoint. The identification information may be taken from the information in the data packet headers. At step 840, it is determined that the second data stream is also bound for the target endpoint. The methods of determining the target endpoint of the second data stream are similar to those used to determine the target endpoint of the first data stream. Thus, the first data stream, which conforms to the first communications protocol, and the second data stream, which conforms to the second communications protocol, are determined to be bound for a common target endpoint.

At step 850, based on the second data stream and the first data stream being bound for the same target endpoint, an indication that the first data stream and the second data stream are both terminal at the single communications device is stored in a first data structure that is embodied on a storage component. An indication that the first data stream and the second data stream are two portions of the collective network traffic terminal at the single communications device is stored. The first data stream and said second data stream can be subjected to joint analysis for the aggregate network capacity demand associated with the target endpoint. As described previously, the first data stream and the second data stream are capable of being merged at the target end point to form a single communication session. For example, the payloads of the data packets may be combined to form a single message or executable program or other data object. In some embodiments, the other endpoint of the communication may be unknown. However, if both endpoints of a data stream are known, they may be used to further validate the determination that the two data streams are part of a single split-flow communications session.

In one embodiment, the split-flow communications session is evaluated for the presence of malicious content. For example, the payloads of packets in the first data stream and the second data stream may be inspected through deep packet inspection to determine if a virus is present. Without associating the first and second data stream as a single split-flow communications session, a full inspection of the communication session would not be possible. In other words, the malicious content could avoid detection by splitting malicious content into two communications of data using different communication protocols. The detection of malicious content is not limited to deep packet inspection for viruses. For example, the overall communication patterns of the split-flow communications session, including traffic to and from the target endpoint, may be evaluated for consistency with traffic patterns known to occur during a zombie attack, a denial of service attack, distributed denial of service attack, or other malicious activity.

In one embodiment, upon detecting malicious activity, a policy to handle the malicious content may be implemented. This policy may include terminating the split-flow communications session, deleting data packets in the data stream containing malicious content, warning a device at the target endpoint, and sanitizing the data packets to remove the malicious content. Other methods of handling the detected malicious content are also possible.

Figure 9:
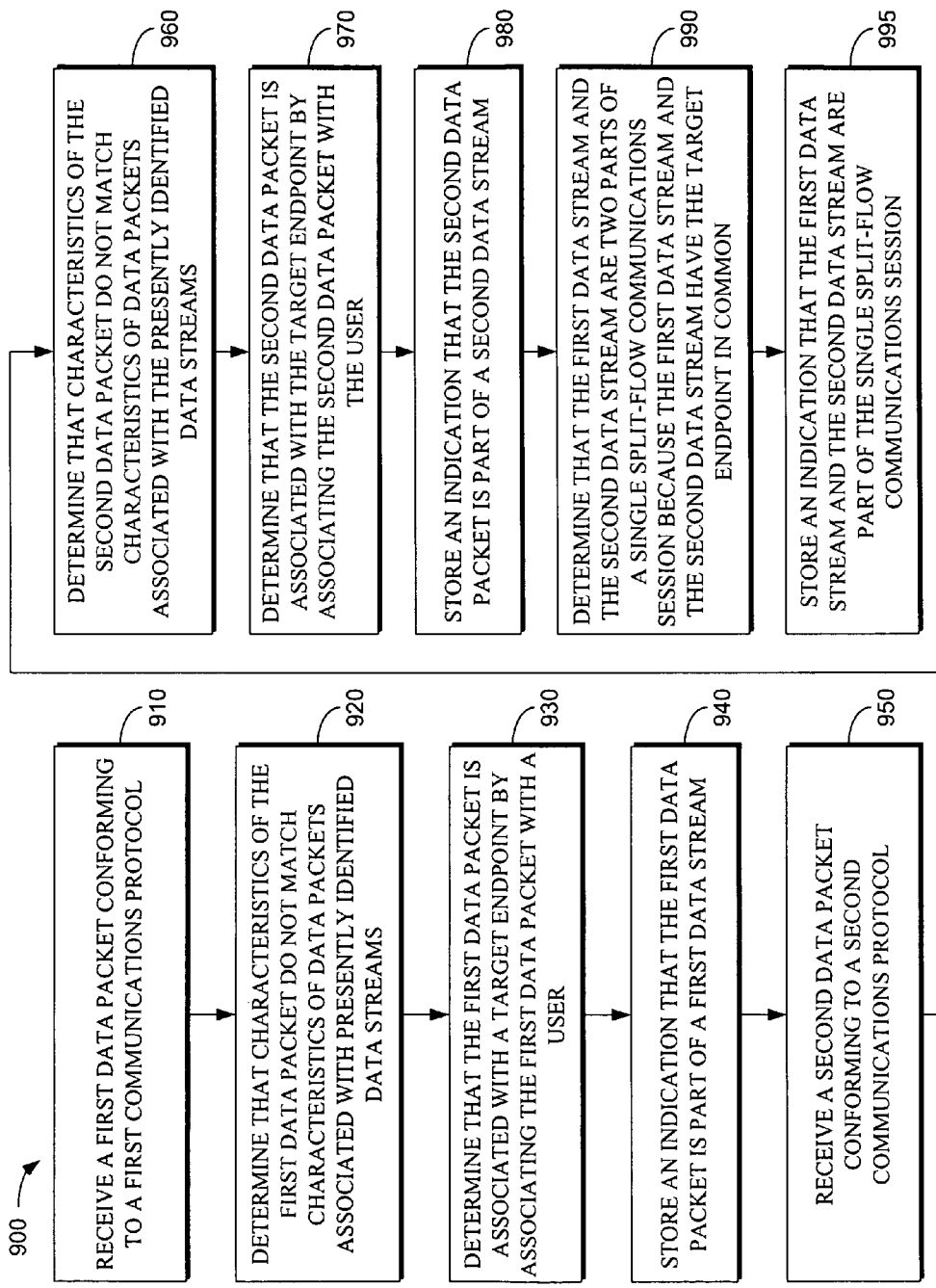
FIG. 9 is a flow diagram in which a method of detecting malicious activity in split-flow communications terminating at a single communications device is described according to an embodiment of the present invention.

Turning now to FIG. 9, a method of detecting malicious activity in split-flow communications terminating at a single communications device, in accordance with an embodiment of the present invention. At step 910, a first data packet is received from a first communication of data formatted according to a first communications protocol. At step 920, the characteristics of the first data packet are determined to not match characteristics of data packets associated with presently identified data streams. Characteristics of data packets that could be used include a source IP address, a destination IP address, a source port and a destination port. Other characteristics of the data packet may also be used to determine that it is not part of an existing data stream. As described previously, a data stream is a transfer of data packets between two endpoints bound by a time period and a unified communicative content.

At step 930, the first data packet is determined to be associated with a target endpoint by associating the first data packet with a device. The device is not specifically identified in the data packet. Rather, the device is associated with the data packet by comparing the characteristics of the data packet with information in a device identification database that associates devices with the characteristics in the data packet. For example, the device database could associate end devices with an IP address assigned to the end device.

At step 940, a first indication that data packets in the first communication of data are part of a first data stream is stored.

In one embodiment, the first indication is stored in a data stream data store, such as data stream data store 720.

At step 950, a second data packet from a second communication of data formatted according to a second communications protocol is received. As described previously, the first communications protocol and the second communications protocol are incompatible. Also as described previously, the first communication of data and the second communication of data may occur over a single data pathway or over multiple data pathways. At step 960, characteristics of the second data packet are determined not to match characteristics of data packets associated with presently identified data streams. At step 970, the second data packet is determined to be associated with the target endpoint by associating the second data packet with the device. Thus, the second data packet is associated with the same target endpoint and the same device as the first data packet. As with the first data packet, the device information is not directly contained in the data packet. Rather, the device and target endpoint are determined by comparing the characteristics of the second data packet with a device identification data store. At step 980, a second indication that data packets in the second communication of data having at least the one characteristic from the second data packet are part of a second data stream.

At step 990, the first data stream and the second data stream are determined to be two parts of a single split-flow communications session because the first data stream and the second data stream have the target endpoint in common. At step 995, an indication that the first data stream and the second data stream are part of the same single split-flow communications session is stored. This indication may be used to reconcile the first data stream with the second data stream and evaluate the two data streams as a single communications session. As described previously, the single communication stream may be analyzed for malicious content. Further, the malicious content may be handled by implementing a policy appropriate for the detected malicious content.

Many different arrangements of the various components depicted, as well as components not shown, are possible without departing from the spirit and scope of the present invention. Embodiments of the present invention have been described with the intent to be illustrative rather than restrictive. Certain features and subcombinations are of utility and may be employed without reference to other features and subcombinations and are contemplated to be within the scope of the claims. Not all steps listed in the various figures need be carried out in the specific order described.

The invention claimed is:

1. One or more non-transitory computer-readable media having computer-executable instructions embodied thereon for performing a method of determining that a first data stream using a first communications protocol and a second data stream using a second communications protocol are terminal at a single communications device, the method comprising:

monitoring a first communication of data including the first data stream including a first data packet formatted according to the first communications protocol;

monitoring a second communication of data including the second data stream including a second data packet formatted according to the second communications protocol;

determining that the first data stream is bound for the single communications device;

determining that the second data stream is also bound for the single communications device; and based on said second data stream and said first data stream being bound for the single communications device, determining that the first data stream and the second data stream are two parts of a split-flow communications session bound for the single communications device and storing in a first data structure that is embodied on a storage component an indication that the first data stream and the second data stream are part of the split-flow communications session.

2. The non-transitory media of claim 1, wherein said first data stream and said second data stream can be subjected to joint analysis for the aggregate network capacity demand associated with the single communications device.

3. The non-transitory media of claim 1, wherein the first data stream is within a first physical data path and the second data stream is within a second data path, and wherein the first data stream is monitored by a first device and the second data stream is monitored by a second device.

4. The non-transitory media of claim 1, wherein the first data stream is associated with the single communications device by:
   receiving the first data packet in the first communication of data;
   determining that the first data packet is not associated with a presently detected data stream, wherein presently detected data streams and characteristics of the presently detected data streams are stored in a second data structure that is embodied on the storage component;
   associating the first data packet with the single communications device by comparing at least one characteristic from a header on the first data packet with a device profile database containing information describing the single communications device;
   assigning the single communications device as the target endpoint of the first data packet; and
   associating all data packets in the first communication of data that are received within a period of time and have the at least one characteristic with the first data stream.

5. The non-transitory media of claim 4, wherein the at least one characteristic is one or more of a source IP address, a destination IP address, a source port, and a destination port.

6. The non-transitory media of claim 1, wherein the method further comprises determining that malicious content is present in the split-flow communications session.

7. The non-transitory media of claim 6, wherein the method further comprises implementing a policy to handle the malicious content.

8. A computerized system for detecting a split-flow communications session occurring in two or more communications of data utilizing at least two incompatible communication protocols, the system comprising:
   a first monitoring component that monitors a first communication of data comprising first data packets formatted according to a first protocol;
   a second monitoring component that monitors a second communication of data comprising second data packets formatted according to a second protocol; and
   a correlation component that determines a first data stream in the first communication of data and a second data stream in the second communication of data are part of a single split-flow communications session by determining the first data stream and the second data stream have a target endpoint in common, wherein the target endpoint is a single communications device; and
   a storage component that stores in a first data structure an indication that the first data stream in the first communication of data and the second data stream in the second communication of data are part of the single split-flow communication session.

9. The system of claim 8, wherein the first protocol and the second protocol utilize disparate addressing domains.

10. The system of claim 8, wherein the correlation component associates the first data stream and the second data stream with the target endpoint based on subscriber profile information for the device associated with the device that corresponds with the target endpoint.

11. The system of claim 8, further comprising a policy component that analyzes the single split-flow communications session for malicious content.

12. The system of claim 8, wherein the policy component, upon detecting the malicious content in the single split-flow communications session, implements a policy to handle the malicious content.

13. The system of claim 8, wherein the first data stream and the second data stream terminate at different communication devices.

14. One or more non-transitory computer-readable media having computer-executable instructions embodied thereon for performing a method of detecting malicious activity in split-flow communications terminating at a single communications device, the method comprising:
   receiving a first data packet from a first communication of data formatted according to a first communications protocol;
   determining that characteristics of the first data packet do not match characteristics of data packets associated with presently identified data streams;
   determining that the first data packet is associated with a target endpoint by associating the first data packet with a device by comparing at least one characteristic from a first header on the first data packet with information in a device profile database;
   storing in a data structure that is embodied on a storage component a first indication that data packets in the first communication of data having the at least one characteristic from the first header are part of a first data stream;
   receiving a second data packet from a second communication of data formatted according to a second communications protocol;
   determining that characteristics of the second data packet do not match characteristics of data packets associated with the presently identified data streams;
   determining that the second data packet is associated with the target endpoint by associating the second data packet with the device by comparing at least one characteristic from a second header on the second data packet with the information in the device profile database;
   storing in the data structure a second indication that data packets in the second communication of data having the at least one characteristic from the second header are part of a second data stream;
   determining that the first data stream and the second data stream are two parts of split-flow communications session because the first data stream and the second data stream have the target endpoint in common;
   storing in the data structure an indication that the first data stream and the second data stream are part of the split-flow communications terminated at the single communications device.

15. The non-transitory media of claim 14, further comprising analyzing the split-flow communications for malicious content.

16. The non-transitory media of claim 15, upon identifying the malicious content in the single split-flow communications, implementing a policy to handle the malicious content.

17. The non-transitory media of claim 16, wherein the malicious content includes one or more of:
- a virus;
- a worm;
- a denial of service attack;
- a zombie control instruction;
- a distributed denial of service attack; and
- an adware.

18. The non-transitory media of claim 16, wherein handling the malicious content includes one or more of terminating the split-flow communications, deleting a plurality of individual data packets including the malicious content, and removing the malicious content from the plurality of individual data packets including the malicious content.

19. The non-transitory media of claim 16, wherein handling the malicious content includes transmitting a notification to the device indicating the malicious content is present in the single split-flow communications session.

20. The non-transitory media of claim 14, wherein the first communications protocol is IPv4 and the second communications protocol is IPv6, and wherein the information in the device profile database includes a IPv4 IP addresses assigned to the device and a IPv6 IP addresses assigned to the device.

* * * * *